(12) United States Patent
Pracher et al.

(10) Patent No.: US 8,348,063 B2
(45) Date of Patent: Jan. 8, 2013

(54) BACKFLUSH DEVICE FOR A FILTER SYSTEM

(75) Inventors: Markus Pracher, Pfedelbach (DE); Albert Schick, Brackenheim (DE); Dietrich Stötzer, Öhringen (DE)

(73) Assignee: Mahle International GmbH (DE)

( * ) Notice: Subject to any disclaimer, the term of this patent is extended or adjusted under 35 U.S.C. 154(b) by 370 days.

(21) Appl. No.: 12/671,080

(22) PCT Filed: Jul. 22, 2008

(86) PCT No.: PCT/EP2008/059561
§ 371 (c)(1),
(2), (4) Date: Jan. 28, 2010

(87) PCT Pub. No.: WO2009/016062
PCT Pub. Date: Feb. 5, 2009

(65) Prior Publication Data
US 2010/0163480 A1 Jul. 1, 2010

(30) Foreign Application Priority Data
Jul. 30, 2007 (DE) .......................... 10 2007 035 967

(51) Int. Cl.
*B01D 33/48* (2006.01)
*B01D 33/50* (2006.01)
*B01D 33/56* (2006.01)
*B01D 33/76* (2006.01)

(52) U.S. Cl. .................... 210/393; 210/398; 210/411

(58) Field of Classification Search .................. 210/411, 210/391, 393, 398
See application file for complete search history.

(56) References Cited

U.S. PATENT DOCUMENTS

| 2,310,587 | A | * | 2/1943 | MacNeill ....................... 210/411 |
| 3,074,556 | A | * | 1/1963 | Rosaen ........................ 210/195.1 |
| 3,131,145 | A | | 4/1964 | Rosaen |
| 3,635,348 | A | | 1/1972 | Carr |
| 4,255,264 | A | | 3/1981 | Madsen |

FOREIGN PATENT DOCUMENTS

| DE | 2309666 A1 | 9/1974 |
| DE | 2327532 A1 | 12/1974 |
| DE | 2704701 A1 | 8/1978 |

(Continued)

OTHER PUBLICATIONS

English abstract provided for DE-4118423.
English abstract provided for DE-19803083.
English abstract for DE-10252785.
English abstract for DE-3341786, Jun. 20, 1985.
Office Action from corresponding EP patent 08786297.5, Dec. 12, 2011.

*Primary Examiner* — Thomas M Lithgow
(74) *Attorney, Agent, or Firm* — Rader, Fishman & Grauer PLLC

(57) ABSTRACT

The invention relates to a backflush device (6) for a filter system (1) for removing impurities from a fluid, the backflush device (6) serving to backflush a filter body (3) in the filter system separating the clean side (5) from the inlet side (4), and comprising at least one backflush nozzle (7) for applying a rinse medium to the filter body (3), said nozzle comprising at least one opening (8) through which the rinse medium flows in a flow direction (9) during backflushing and exits the backflush nozzle (7). In order to improve the effectiveness of the backflushing, the at least one opening is designed as a slit opening (8) extending transverse to the flow direction (9) in a straight line having a constant cross-sectional profile (16) comprising a nozzle segment (17) expanding the flow direction (9).

18 Claims, 3 Drawing Sheets

FOREIGN PATENT DOCUMENTS

| | | |
|---|---|---|
| DE | 2924901 A1 | 1/1980 |
| DE | 3341786 | 6/1985 |
| DE | 3611075 A1 | 10/1987 |
| DE | 4118423 A1 | 9/1992 |
| DE | 19803083 A1 | 7/1999 |
| DE | 10252785 A1 | 5/2004 |

* cited by examiner

BACKFLUSH DEVICE FOR A FILTER SYSTEM

CROSS-REFERENCES TO RELATED APPLICATIONS

This application is a National Stage application which claims the benefit of International Application No. PCT/EP2008/059561 filed Jul. 22, 2008, which claims priority based on German Application No. 10 2007 035 967.7, filed Jul. 30, 2007, both of which are hereby incorporated by reference in their entirety.

TECHNICAL FIELD

The present invention relates to a backflush device for a filter system for removing impurities from a fluid, the backflush device in the filter system serving to backflush a filter body in the filter system which separates a clean side from an inlet side.

BACKGROUND

Filter systems in industrial or stationary applications are used in a multiplicity of processes, for example for filtering out liquid or solid particles from a gas flow or solid particles from a liquid flow. To this end, the respective filter system uses at least one filter body which separates an inlet space from a clean space inside the system. To this end the filter body has a filter material through which the respective fluid can flow and which is impermeable for the particles which are to be filtered out. In the course of the cleaning operation or filtering operation the filtered out particles can accumulate or deposit on the filter material, that is, on the inlet side of the filter body. This increases the flow resistance of the filter body. In order that the filtering operation does not have to be interrupted, or only has to be interrupted for a short time, modern filter systems can be equipped with a backflush device, with the aid of which the filter body can be backflushed with a suitable rinse medium. The backflushing then takes place counter to the filtering direction, that is, from the clean side to the inlet side. This means that the impurities which have deposited on the inlet side of the filter body can be removed. Such a backflush device can operate with at least one backflush nozzle, with the aid of which the respective rinse medium is applied to the clean side of the filter body. To this end, such a backflush nozzle can have a multiplicity of openings through which the rinse medium flows in a flow direction, which is defined by the longitudinal axis of the opening, and exits from the backflush nozzle during backflushing. The rinse medium passes through such point-like openings at a corresponding backflush pressure with a straight jet or with a jet which fans out in a cone-shaped manner out of the respective opening and impinges on the filter body over a corresponding circular impact area.

SUMMARY

The present invention is concerned with the problem of specifying an improved embodiment for a backflush device and for a filter system equipped therewith and for a backflush nozzle of such a backflush device, which is characterised in particular in that it impinges on the filter body in a more uniform manner and thus has a more uniform backflushing effect.

This problem is solved according to the invention by the subject matter of the independent claims. Advantageous embodiments form the subject matter of the dependent claims.

The invention is based on the general idea of equipping the backflush nozzle with a slit opening, that is, with a slit-shaped opening, which extends in a straight line transversely with respect to the flow direction with a constant cross-sectional profile, with the cross sectional profile having in particular a nozzle segment which expands in the flow direction. The slit shape of the opening means that the impact area for the backflush medium against the clean side of the filter body is rectangular. This means in particular that the backflush medium is applied uniformly to the filter body over the entire length of the slit opening. Correspondingly a relatively uniform backflush effect is also produced, which leads overall to an improved performance of the backflush device and thus of the filter system equipped with it.

Also particularly advantageous is the nozzle profile of the slit opening, which is characterised by the nozzle segment which expands in the flow direction. The backflush medium can be accelerated in the flow direction in the slit opening through the nozzle profile, as a result of which the backflush medium obtains a relatively high momentum which can be used to increase the backflush effect on the filter body.

In an advantageous embodiment, the backflush nozzle can have a nozzle body which contains at least one slit opening, with the backflush nozzle also having at least one nozzle support into which the nozzle body is inserted. In this embodiment the nozzle body and the nozzle support can be produced separately, as a result of which for example different materials can be used which are optimised for the respective function of the respective component.

In a particularly advantageous embodiment of a filter system equipped with the backflush device, the backflush nozzle can be arranged in the filter body in such a manner that it is at a distance from the filter body in the flow direction. This means that there is no direct physical contact between the backflush nozzle and the filter body. Furthermore, the backflush jet can flow openly through the cleaned fluid which is present on the clean side of the filter body, as long as the backflushing is carried out when the filter body is full, in particular during the filtering operation. Although this is associated with increased friction, it can be compensated by the high flow speed of the backflush medium. The contactless arrangement of the backflush nozzle and the filter body means that for example wear of the backflush nozzle can be considerably reduced if a relative rotation between the backflush nozzle and the filter body is used to clean off the filter body by backflushing gradually, virtually segment by segment, in the circumferential direction.

Further important features and advantages of the invention can be found in the subclaims, the drawings and the associated description of the figures using the drawings.

It is self-evident that the features which are mentioned above and those which are still to be explained below can be used not only in the combination specified in each case, but also in other combinations or alone without departing from the framework of the present invention.

BRIEF DESCRIPTION OF THE DRAWING

Preferred exemplary embodiments of the invention are shown in the drawings and are explained in more detail in the following description, with the same reference symbols referring to the same or similar or functionally identical components.

In the figures.

DETAILED DESCRIPTION

Figure 1:
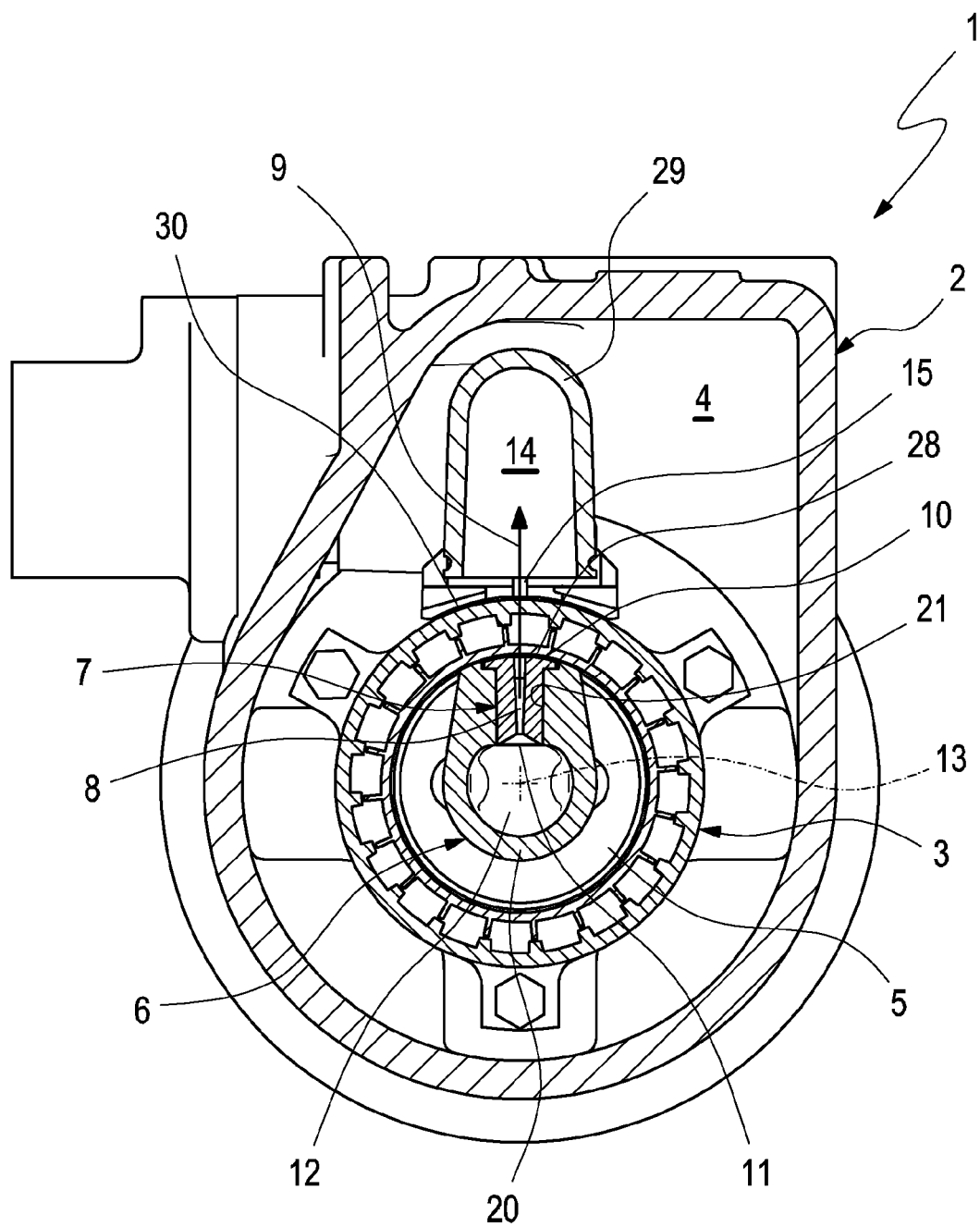
FIG. 1 schematically shows a cross section through a filter system.

According to FIG. 1 a filter system 1 has a housing 2 in which a filter body 3 is arranged. The filter body 3 separates an inlet space 4 or inlet side 4 from a clean space 5 or clean side 5 in the housing 2. The filter body 3 has a cylindrical configuration and is preferably constructed in such a manner that it is flowed through radially from outside inwards during filtering operation. Accordingly, the inlet space 4 is situated radially outside the filter body 3, whereas the clean space 5 is surrounded by the filter body 3. The filter body 3 can for example be what is known as an edge-split filter. In principle any other desired designs for the filter body 3 are likewise conceivable, such as a filter body consisting of micromesh material or of a pleated filter material. The filter system 1 is used to remove impurities from a fluid. In particular solid particles can be filtered out of a liquid. In principle it is also possible to filter out solid or liquid particles from a gas. The contaminated fluid is supplied via a corresponding feed (not shown) to the interior of the housing 2, that is, the inlet space 4, while the cleaned fluid is conducted away via a corresponding outlet (not shown) from the interior of the filter body 3, that is, out of the clean space 5.

During filtering operation the impurities which cannot flow through the filter body 3 accumulate, concentrate and in particular form what is known as a filter cake on the inlet-side outer side of the filter body 3. Although such a layer of impurities increases the filtration effect of the filter body 3, the flow resistance of the filter body 3 also increases. Accordingly it is necessary to remove the deposited impurities regularly. To this end the filter system 1 is equipped with a backflush device 6, with the aid of which the filter body 3 can be backflushed. This means that a suitable rinse medium flows through the filter body 3 counter to the cleaning direction. This means in the present case that the backflush device 6 drives a backflush medium in a suitable manner through the filter body 3 from the clean space 5 in the direction of the inlet space 4. To this end the backflush device 6 has at least one backflush nozzle 7. The backflush device 6 can apply the respective rinse medium to the filter body 3 with the aid of this backflush nozzle 7. The backflush nozzle 7 has at least one opening 8 through which the rinse medium flows in a flow direction 9, which is indicated here by an arrow, and exits from the backflush nozzle 7 during backflushing. The opening 8 is open towards the filter body 3 at its exit end 10 and communicates at its entry end 11 with a feed duct 12. The backflush device 6 supplies the respective backflush nozzle 7 with the aid of the feed duct 12 with the rinse medium, which can be applied in particular with a corresponding comparatively high rinse pressure. In principle the backflush device 6 can have more than one such backflush nozzle 7, which can be arranged one after the other in the axial direction of the filter body 3, that is, parallel to the longitudinal centre axis 13 of the filter body 3.

In the example shown, the backflush device 6 also comprises an outlet duct 14 which is arranged in the inlet space 4 and has at least one intake opening 15 which faces the filter body 3. The backflush medium together with the removed deposits can pass through the respective intake opening 15 into the outlet duct 14, from where it is transported away. To this end, a correspondingly low pressure prevails in the outlet duct 14. The intake opening 15 is expediently arranged in alignment with the opening 8 of the backflush nozzle 7.

In order to be able to clean off the entire filter body 3 gradually along its entire surface, the filter system 1 can also be equipped with a drive (not shown here), which allows a relative movement between the filter body 3 on the one hand and the backflush nozzle 7 and where present the outlet duct 14 on the other. In the preferred example the components of the backflush device 6, that is in particular the backflush nozzle 7 and the outlet duct 14, are arranged in a stationary manner while the filter body 3 is driven such that it rotates about its longitudinal centre axis 13.

According to FIGS. 1 to 5, the opening 8 of the backflush nozzle 7 is according to the invention configured as a slit opening which is referred to below with 8. This slit opening 8 extends in a straight line transversely with respect to the flow direction 9. Furthermore, the slit opening 8 has an essentially constant cross-sectional profile 16 transversely to the flow direction 9. This cross-sectional profile 16 has according to FIG. 5 a nozzle segment 17 which expands in the flow direction 9. The expanding cross section which can be flowed through in the cross-sectional profile 16 leads in the nozzle segment 17 to a drop in pressure and thus to an acceleration of the rinse medium.

The slit opening 8 is preferably also equipped in its cross-sectional profile 16 with an entry segment 18. This entry segment 18 is adjacent directly upstream of the nozzle segment 17 and has a cross section which can be flowed through which decreases in the flow direction 9. This means that a concentration of pressure can be realised as far as a transitional cross section 19 in which the entry segment 18 ends and the nozzle segment 17 begins.

Figures 4, 5:
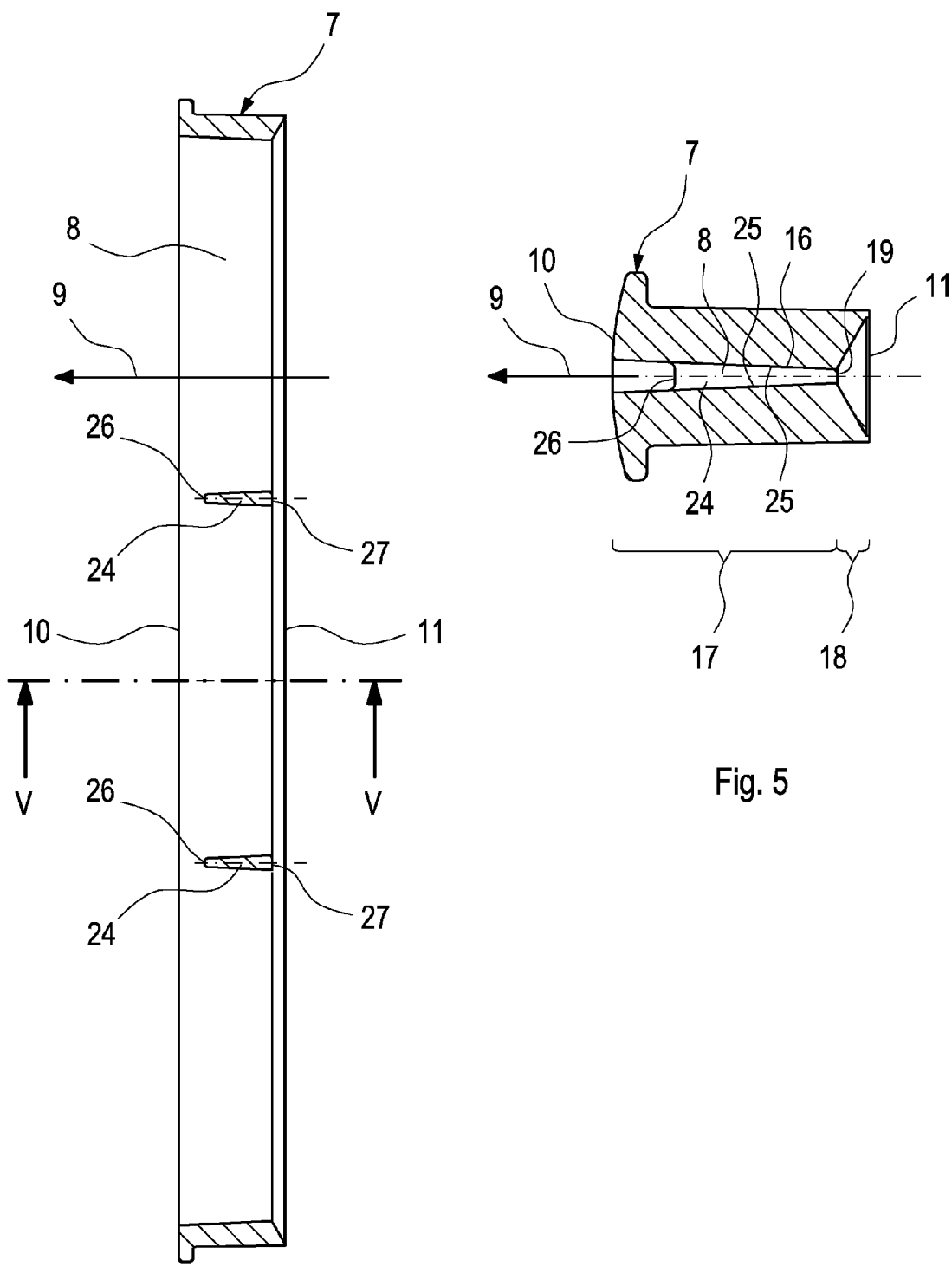

According to FIG. 5 the cross-sectional profile 16 in the nozzle segment 17 can preferably be equipped with an acute angle. This can in particular be less than 10°. In contrast to this, the cross-sectional profile 16 in the entry segment 18 can have an obtuse angle. This obtuse angle can in particular be greater than 100°.

The cross-sectional profile 16 in the nozzle segment 17 and in the entry segment 18 is preferably bounded in each case by straight wall contours. According to a particularly advantageous embodiment, the slit opening 8 in the cross-sectional profile 16 can form a de Laval nozzle. Such a de Laval nozzle is especially suitable for accelerating the rinse medium.

Figure 2:
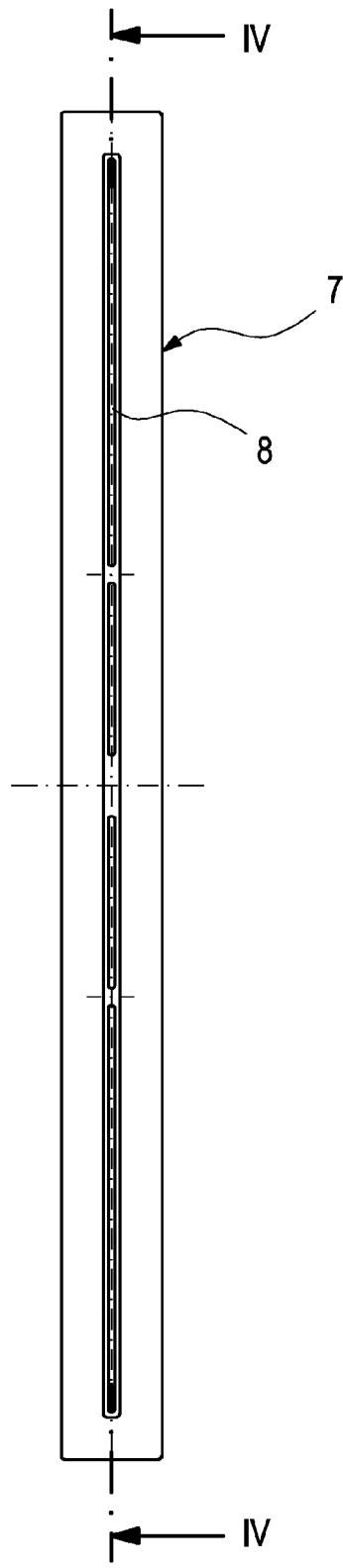
FIG. 2 schematically shows a view of a backflush nozzle.

In the embodiment shown in FIG. 2 the nozzle body 7 is produced from one piece and can in this manner be inserted into a feed duct support 20 which contains the feed duct 12 and has a corresponding nozzle body holder 21 for this purpose.

Figure 3:
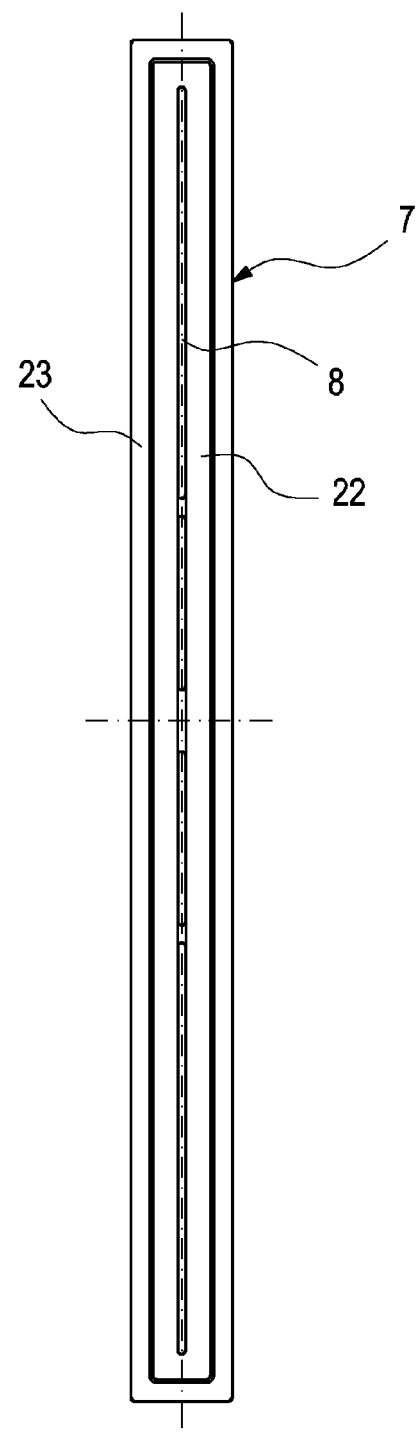
FIG. 3 schematically shows a view as in FIG. 2, but in a different embodiment of the backflush nozzle, FIG. 4 schematically shows a longitudinal section through the backflush nozzle according to section lines IV in FIG. 2, FIG. 5 schematically shows a cross section of the backflush nozzle corresponding to section lines V in FIG. 4.

In contrast to this, FIG. 3 shows an embodiment in which the backflush nozzle 7 is formed in two pieces. In FIG. 3 the backflush nozzle 7 therefore comprises a nozzle body 22 which contains the at least one slit opening 8 and a nozzle support 23 into which the nozzle body 22 is inserted. The nozzle body 22 and the nozzle support 23 expediently form components which are produced separately from each other and can be produced in particular from different materials. In the assembled state the nozzle body 22 can be fixed in a suitable manner to the nozzle support 23. For example, the nozzle body 22 can be welded to the nozzle support 23. The nozzle body 22 can be configured as an injection moulded part, for example of plastic. It is likewise possible in principle to configure the nozzle support 23 as an injection moulded part, for example of plastic.

According to FIGS. 2 and 4, the slit opening 8 can be broken up in its longitudinal direction by one or a plurality of webs 24. The respective web 24 is situated in the slit opening 8 and extends parallel to the flow direction 9. The respective web 24 is used to brace the nozzle body 22 or to brace the backflush nozzle 7. To this end the respective web 24 connects the mutually opposite wall segments 25 which bound the slit opening 8 transversely to the flow direction 9. The respective web 24 is preferably configured in such a manner that it is only situated in the nozzle segment 17. An outflow edge 26 of the respective web 24 can be at a distance from the exit end 10 of the slit opening 8. In contrast to this, an inflow edge 27 can be arranged exactly at the entry end of the nozzle segment 17, that is, essentially in the plane of the transitional cross section 19. In the longitudinal section of the backflush nozzle 7 the respective web 24 can have a profile which tapers in the flow direction 9 according to FIG. 4.

According to a particularly advantageous embodiment, the backflush nozzle 7 can be mounted in such a manner relative to the filter body 3 that it is at a distance from the filter body 3 in the flow direction, that is, has no direct contact with the filter body 3. To this end, the backflush nozzle 7 is at a distance in the radial direction from the filter body 3. Correspondingly, the feed duct support 20 can also be arranged at a distance from the filter body 3, so that there is no contact either between the feed duct support 20 and the filter body 3 on both sides of the backflush nozzle 7 in the circumferential direction of the filter body 3. This means that a particularly low-friction and low-wear interaction can be realised between the backflush device 6 and the filter body 3 at least on the clean side 5. The said distance between the backflush nozzle 7 and the filter body 3 is referred to in FIG. 1 with 28. It corresponds to a gap which is formed radially between the filter body 3 and the backflush nozzle 7.

An outlet duct support 29 can in principle likewise be positioned in the inlet space 4 opposite the filter body 3 in such a manner that a radial gap 30 is likewise formed here between the filter body 3 and the outlet duct support 29. A relatively large overlap in the circumferential direction means that a sufficient sealing effect can be achieved. Reduced friction and reduced wear can thus also be realised on the inlet side 4 between the filter body 3 and the outlet duct support 29.

The fluid which has already been cleaned can for example be used as the rinse medium. If cleaning a liquid, a gas, for example compressed air, can also be used as the rinse medium. Accordingly, compressible and incompressible media can be used as the rinse medium. Depending on the application and the rinse medium used, differently designed backflush nozzles 7 can be used. In this case the two-part design of the backflush nozzle 7 with a nozzle body 22 and nozzle support 23 makes it possible to replace each nozzle body 22 in a simple manner.

The invention claimed is:

1. A filter system backflush device comprising: at least one backflush nozzle configured in a filter system for applying a rinse medium to a filter body that separates a clean side of the filter system from an inlet side in the filter system, wherein
the backflush nozzle has at least one opening through which the rinse medium flows in a flow direction and exits from the backflush nozzle during backflushing,
the opening is configured as an elongate slit opening which extends in a straight line in a vertical direction transverse to the flow direction,
the opening has a constant cross-sectional profile corresponding to cross-sections orthogonal to the vertical direction,
the opening comprises a nozzle segment in which cross-sectional profiles of the opening, corresponding to cross sections orthogonal to the flow direction, expand in the flow direction,
the opening comprises an entry segment in which cross-sectional profiles of the opening, corresponding to cross sections orthogonal to the flow direction, expand in a direction opposite to the flow direction, and
the entry segment is upstream from and adjoins the nozzle segment.

2. The backflush device according to claim 1, wherein the cross-sectional profile of the opening, corresponding to cross-sections orthogonal to the vertical direction, is configured as a de Laval nozzle.

3. The backflush device according to claim 1 wherein:
in the nozzle segment, the cross-sectional profiles of the opening corresponding to cross sections orthogonal to the flow direction expand at an acute angle, which is less than approximately 10°, and
in the entry segment, the cross-sectional profiles of the opening corresponding to cross sections orthogonal to the flow direction expand at an obtuse angle, which is greater than approximately 100°.

4. The backflush device according to claim 1, wherein the backflush nozzle is configured from at least one piece, and the backflush nozzle comprises a nozzle body, which contains the opening, and a nozzle support, wherein the nozzle body is inserted into the nozzle support.

5. The backflush device according to claim 4, wherein:
the nozzle body and the nozzle support are separate components and the nozzle body is at least one of:
separated from the nozzle support,
fixed in the nozzle support, and
fixed on the nozzle support; and
the nozzle body and the nozzle support are configured as individually injection moulded parts.

6. The backflush device according to claim 1, wherein at least one web is arranged in the opening, wherein the web connects mutually opposite wall segments which bound the opening.

7. The backflush device according to claim 6, wherein the respective web is arranged exclusively in the nozzle segment, and wherein the respective web includes an outflow edge and an inflow edge such that at least one of the outflow edge is arranged at a distance from the exit end of the nozzle segment, and the inflow edge of the respective web is arranged at the entry end of the nozzle segment, and the respective web tapers in the flow direction.

8. The filter system according to claim 1, wherein the backflush nozzle is arranged at a distance from the filter body in the flow direction.

9. The backflush device according to Claim 1, wherein at least one of the cross-sectional profile in the nozzle segment expands at an acute angle which is less than approximately 10°, the cross-sectional profile in the entry segment decreases at an obtuse angle which is greater than approximately 100°, the cross-sectional profile in the nozzle segment is bounded by at least one of a nozzle straight wall contour and a nozzle wall segment, the cross-sectional profile in the entry segment is bounded by at least one of an entry straight wall contour and an entry wall segment, and the cross-sectional profile is configured as a de Laval nozzle.

10. The backflush device according to claim 3, wherein the backflush nozzle is configured from at least one piece, and the backflush nozzle comprises a nozzle body which contains the opening and a nozzle support, wherein the nozzle body is inserted into the nozzle support.

11. The backflush device according to claim 3, wherein at least one web is arranged in the opening, wherein the web connects mutually opposite wall segments which bound the opening.

12. The backflush device according to claim 4, wherein at least one web is arranged in the opening, wherein the web connects mutually opposite wall segments which bound the opening.

13. The backflush device according to claim 5, wherein at least one web is arranged in the opening, wherein the web connects mutually opposite wall segments which bound the opening.

14. A filter system comprising:
a pressure stable filter housing having a housing interior with a clean region and an inlet region;
a cylindrical filter body with an axis extending in a vertical direction disposed in the housing interior comprising filter walls that are configured to filter contaminants from a fluid and that define the boundary between the clean region and the inlet region;
a backflush device disposed in the inlet region and configured to apply a rinse medium to a circumferential segment of the filter body over the entire vertical height of the filter body, the backflush device comprising at least one backflush nozzle, wherein
the backflush nozzle has a plurality of openings through which the rinse medium flows in a flow direction and exits from the backflush nozzle during backflushing,
each opening is configured as an elongate slit opening which extends in a straight line in the vertical direction transverse to the flow direction,
each opening has a constant cross-sectional profile corresponding to cross-sections orthogonal to the vertical direction,
each opening comprises a nozzle segment in which cross-sectional profiles of the opening, corresponding to cross sections orthogonal to the flow direction, expand in the flow direction,
each opening comprises an entry segment in which cross-sectional profiles of the opening, corresponding to cross sections orthogonal to the flow direction, expand in a direction opposite to the flow direction, and
the entry segment is upstream from and adjoins the nozzle segment; and
an outlet duct disposed in the clean region comprising an intake opening directly opposite from the backflush nozzle and configured to receive rinse medium that is ejected by the backflush device and passed through the filter walls during backflushing, wherein the filter body is configured to rotate relative to the filter housing, the outlet duct, and the backflush device.

15. The filter system according to claim 14, wherein, for a given opening:

in the nozzle segment, the cross-sectional profiles of the opening corresponding to cross sections orthogonal to the flow direction expand at an acute angle, which is less than approximately 10°, and in the entry segment, the cross-sectional profiles of the opening corresponding to cross sections orthogonal to the flow direction expand at an obtuse angle, which is greater than approximately 100°.

16. The filter system of claim 14, wherein, for a given opening:
at least one web is arranged in the opening, the web connecting mutually opposite wall segments which bound the opening;
the respective web is arranged exclusively in the nozzle segment;
the respective web includes an outflow edge and an inflow edge such that the outflow edge is arranged at a distance from the exit end of the nozzle segment and the inflow edge of the respective web is arranged at the entry end of the nozzle segment; and
the respective web tapers in the flow direction.

17. The filter system of claim 14, wherein:
the backflush nozzle comprises a nozzle body, which contains the openings, and a nozzle support;
the nozzle body is inserted into the nozzle support;
the nozzle body and the nozzle support are separate components;
the nozzle body is at least one of:
separated from the nozzle support,
fixed in the nozzle support, and
fixed on the nozzle support; and
the nozzle body and the nozzle support are configured as individually injection moulded parts.

18. A filter system backflush device comprising: at least one backflush nozzle configured in a filter system for applying a rinse medium to a filter body that separates a clean side of the filter system from an inlet side in the filter system, wherein
the backflush nozzle has at least one opening through which the rinse medium flows in a flow direction and exits from the backflush nozzle during backflushing;
the opening is configured as an elongate slit opening that extends in a straight line in a non-flow direction transverse to the flow direction and having a constant cross sectional profile, and a profile segment that expands in the flow direction;
at least one web being arranged in the slit opening, wherein the web connects mutually opposite wall segments that bound the slit opening; and
the web being arranged exclusively on the nozzle segment, and wherein the respective web includes an outflow edge and an inflow edge such that at least one of an outflow edge is arranged at a distance from the exit end of the nozzle segment and the inflow edge of the respective web is arranged at the entry end of the nozzle segment, and the respective web tapers in the flow direction.

* * * * *